(12) United States Patent
Deshpande

(10) Patent No.: US 10,473,159 B2
(45) Date of Patent: Nov. 12, 2019

(54) HYDRODYNAMIC BEARING FEATURES

(71) Applicant: Energy Recovery, Inc., San Leandro, CA (US)

(72) Inventor: Chinmay Vishwas Deshpande, Fremont, CA (US)

(73) Assignee: ENERGY RECOVERY, INC., San Leandro, CA (US)

( * ) Notice: Subject to any disclaimer, the term of this patent is extended or adjusted under 35 U.S.C. 154(b) by 650 days.

(21) Appl. No.: 14/958,575

(22) Filed: Dec. 3, 2015

(65) Prior Publication Data

US 2016/0160917 A1    Jun. 9, 2016

Related U.S. Application Data

(60) Provisional application No. 62/088,342, filed on Dec. 5, 2014.

(51) Int. Cl.
*F16C 32/06* (2006.01)
*F04F 13/00* (2009.01)
(Continued)

(52) U.S. Cl.
CPC .......... *F16C 32/0644* (2013.01); *F04F 13/00* (2013.01); *F16C 32/0659* (2013.01);
(Continued)

(58) Field of Classification Search
CPC ........ F04F 13/00; E21B 43/26; E21B 43/267; E21B 43/16; F16C 32/06; F16C 32/0644;
(Continued)

(56) References Cited

U.S. PATENT DOCUMENTS 3,132,906 A * 5/1964 Sternlicht ............... F16C 17/02
 384/114
3,201,183 A 8/1965 Buske
(Continued)

FOREIGN PATENT DOCUMENTS

CN 101817573 A 9/2010
EP 1719920 A1 11/2006
(Continued)

OTHER PUBLICATIONS

Steinhilper, W. et al.; "Optimierung hydrodynamisch arbeitender Gleitlager"; Antriebstechnik, Vereinigte Fachverlage, Mainz, DE; vol. 36, No. 10; Oct. 1, 1997; pp. 69-73.
(Continued)

*Primary Examiner* — Philip E Stimpert
(74) *Attorney, Agent, or Firm* — Fletcher Yoder, P.C.

(57) ABSTRACT

A system includes a hydraulic transfer system configured to exchange pressures between a first fluid and a second fluid, where the first fluid has a pressure higher than the second fluid, includes a sleeve comprising an elliptical shape, a cylindrical rotor disposed within the sleeve in a concentric arrangement, where the cylindrical rotor is configured to rotate circumferentially about a rotational axis and has a first end face and a second end face disposed opposite each other. The system includes a first and second end cover having a first and second surface which interface with a first and second end face of the rotor. The system includes a first and a second radial clearance disposed between the sleeve and the cylindrical rotor, where the radial clearances are configured to increase or decrease based at least in part on a pressure differential.

2 Claims, 10 Drawing Sheets

(51) Int. Cl.
*F16C 33/10* (2006.01)
*F16C 17/02* (2006.01)
*F16C 17/04* (2006.01)

(52) U.S. Cl.
CPC ........ *F16C 33/1075* (2013.01); *F16C 17/028* (2013.01); *F16C 17/047* (2013.01)

(58) Field of Classification Search
CPC .............. F16C 32/0692; F16C 32/0659; F04B 1/0465; F04B 1/188; F04B 1/12; F04B 1/122; F04B 1/20; F04B 1/2014; F04B 2/2021
USPC .......................................... 384/114, 118, 121
See application file for complete search history.

(56) References Cited

U.S. PATENT DOCUMENTS

| | | | |
|---|---|---|---|
| 4,348,065 A * | 9/1982 | Yoshioka | F16C 33/1075 384/121 |
| 5,129,738 A | 7/1992 | Nakagawa | |
| 6,036,435 A | 3/2000 | Oklejas | |
| 6,244,749 B1 | 6/2001 | Nakagawa et al. | |
| 7,207,381 B2 | 4/2007 | Sharp | |
| 8,834,028 B2 | 9/2014 | Winkler et al. | |
| 9,726,189 B2 | 8/2017 | Nishida et al. | |
| 2006/0245909 A1* | 11/2006 | Stover | F04F 13/00 415/1 |
| 2014/0128655 A1 | 5/2014 | Arluck et al. | |

FOREIGN PATENT DOCUMENTS

| | | |
|---|---|---|
| EP | 2626604 A1 | 8/2013 |
| WO | 96/17176 A1 | 6/1996 |
| WO | 2009/046429 A2 | 4/2009 |
| WO | 2014/030727 A2 | 2/2014 |

OTHER PUBLICATIONS

PCT International Search Report and Written Opinion; Application No. PCT/US2015/063872; dated Mar. 17, 2016; 17 pages.
CN Office Action; dated Dec. 5, 2018; Application No. 201580075605.X; 7 pages.

* cited by examiner

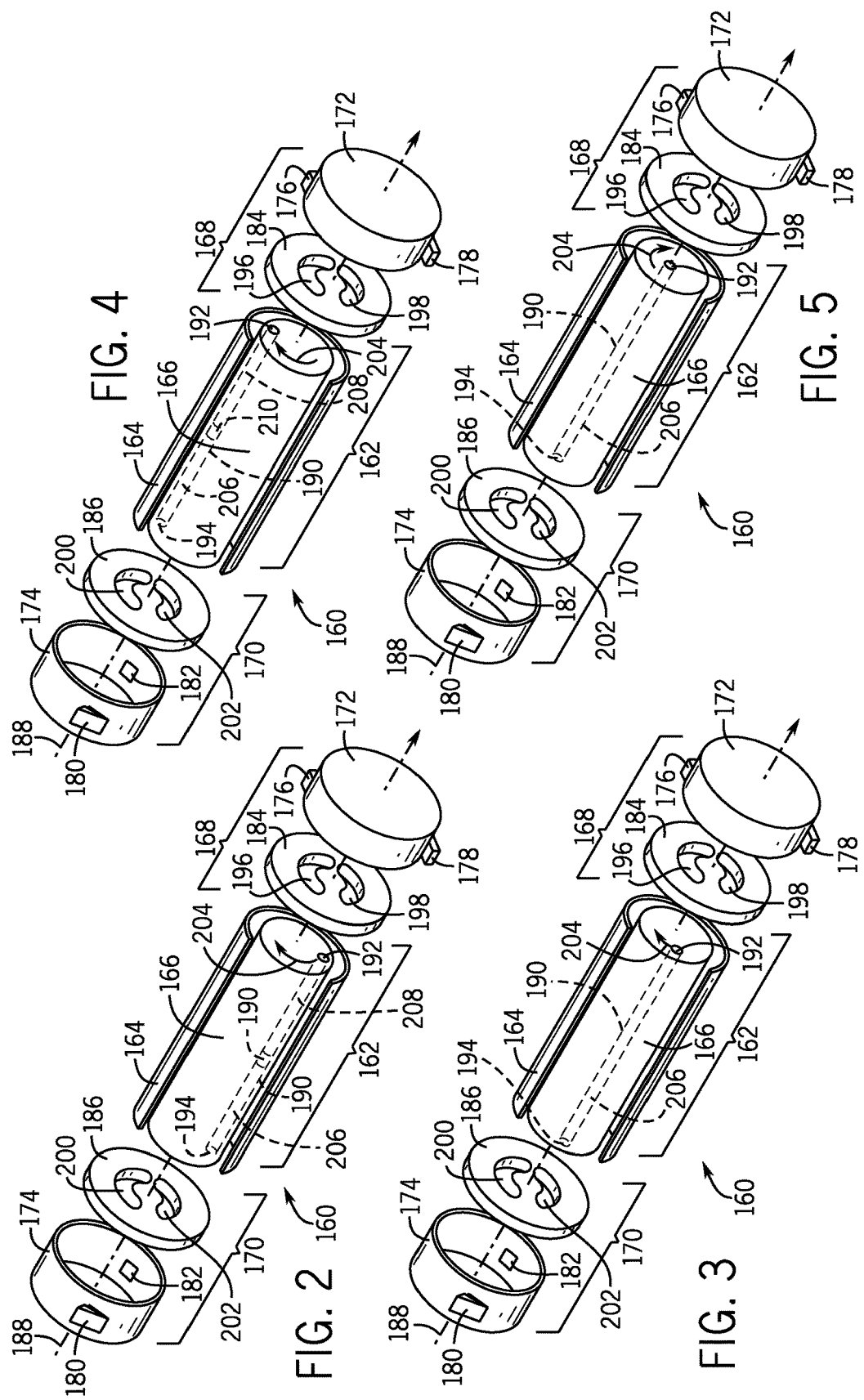

HYDRODYNAMIC BEARING FEATURES

CROSS-REFERENCE TO RELATED APPLICATION

This application claims priority to and benefit of U.S. Provisional Patent Application No. 62/088,342, entitled "Hydrodynamic Bearing Features" filed on Dec. 5, 2014, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid handling equipment, such as rotary pumps and pressure exchangers, may be susceptible to loss in efficiency, loss in performance, wear, and sometimes breakage over time. As a result, the equipment must be taken off line for inspection, repair, and/or replacement. Unfortunately, the downtime of this equipment may be labor intensive and costly for the particular plant, facility, or work site. In certain instances, the fluid handling equipment may be susceptible to misalignment, imbalances, or other irregularities, which may increase wear and other problems, and also cause unexpected downtime. This equipment downtime is particularly problematic for continuous operations. Therefore, a need exists to increase the reliability and longevity of fluid handling equipment.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is an exploded perspective view of an embodiment of a rotary IPX in a first operating position;

FIG. 3 is an exploded perspective view of an embodiment of a rotary IPX in a second operating position;

FIG. 4 is an exploded perspective view of an embodiment of a rotary IPX in a third operating position;

FIG. 5 is an exploded perspective view of an embodiment of a rotary IPX in a fourth operating position;

DETAILED DESCRIPTION OF SPECIFIC EMBODIMENTS

Figure 1:
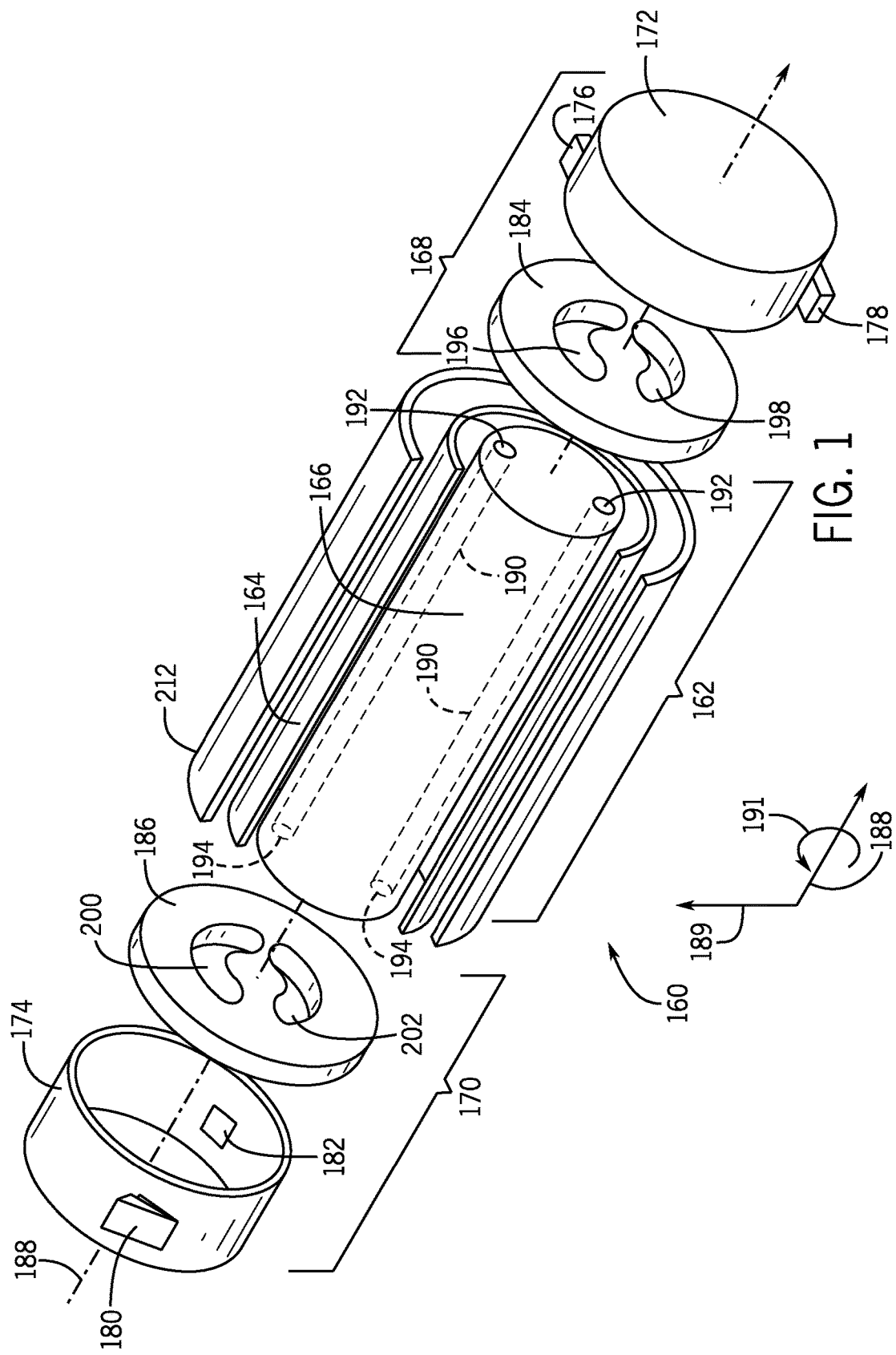
FIG. 1 is an exploded perspective view of an embodiment of a rotary isobaric pressure exchanger (rotary IPX)

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, a hydraulic energy transfer system transfers work and/or pressure between a first fluid (e.g., a pressure exchange fluid) and a second fluid (e.g., frac fluid or a salinated fluid). In certain embodiments, the first fluid may be substantially "cleaner" than the second fluid. In other words, the second fluid may contain dissolved and/or suspended particles. Moreover, in certain embodiments, the second fluid may be more viscous than the first fluid. Additionally, the first fluid may be at a first pressure between approximately 5,000 kPa to 25,000 kPa, 20,000 kPa to 50,000 kPa, 40,000 kPa to 75,000 kPa, 75,000 kPa to 100,000 kPa or greater than a second pressure of the second fluid. In operation, the hydraulic energy transfer system may or may not completely equalize pressures between the first and second fluids. Accordingly, the hydraulic energy transfer system may operate isobarically, or substantially isobarically (e.g., wherein the pressures of the first and second fluids equalize within approximately +/−1, 2, 3, 4, 5, 6, 7, 8, 9, or 10 percent of each other).

The hydraulic energy transfer system may also be described as a hydraulic protection system, hydraulic buffer system, or a hydraulic isolation system, because it blocks or limits contact between the second fluid and various pieces of hydraulic equipment (e.g., high-pressure pumps, heat exchangers), while still exchanging work and/or pressure between the first and second fluids. By blocking or limiting contact between various pieces of hydraulic equipment and the second fluid (e.g., more viscous fluid, fluid with suspended solids), the hydraulic energy transfer system reduces abrasion/wear, thus increasing the life/performance of this equipment (e.g., high-pressure pumps). Moreover, it may enable the hydraulic system to use less expensive equipment, for example high-pressure pumps that are not designed for abrasive fluids (e.g., fluids with suspended particles). In some embodiments, the hydraulic energy transfer system may be a hydraulic turbocharger, a rotating isobaric pressure exchanger (e.g., rotary IPX), or a non-rotating isobaric pressure exchanger (e.g., bladder, reciprocating isobaric pressure exchanger). Rotating and non-rotating isobaric pressure exchangers may be generally defined as devices that transfer fluid pressure between a high-pressure inlet stream and a low-pressure inlet stream at efficiencies in excess of approximately 50%, 60%, 70%, 80%, or 90% without utilizing centrifugal technology.

As explained above, the hydraulic energy transfer system transfers work and/or pressure between first and second fluids. These fluids may be multi-phase fluids such as gas/liquid flows, gas/solid particulate flows, liquid/solid particulate flows, gas/liquid/solid particulate flows, or any other multi-phase flow. Moreover, these fluids may be non-Newtonian fluids (e.g., shear thinning fluid), highly viscous fluids, non-Newtonian fluids containing proppant, or highly viscous fluids containing proppant. The proppant may include sand, solid particles, powders, debris, ceramics, or any combination therefore. For example, the disclosed embodiments may be used with oil and gas equipment, such as hydraulic fracturing equipment using a proppant (e.g., particle laden fluid) to frac rock formations in a well.

FIG. 1 is an exploded perspective view of an embodiment of a rotary isobaric pressure exchanger 160 (rotary IPX) capable of transferring pressure and/or work between the first and second fluids with minimal mixing of the fluids. It should be noted that reference to various directions (e.g., axial direction 188, radial direction 189, and circumferential direction 191) may be referred to in the following discussion. The rotary IPX 160 may include a generally cylindrical body portion 162 that includes a sleeve 164 and a rotor 166 disposed within a housing 212. The rotary IPX 160 may also include two end caps 168 and 170 that include manifolds 172 and 174, respectively. Manifold 172 includes respective inlet and outlet ports 176 and 178, while manifold 174 includes respective inlet and outlet ports 180 and 182. In operation, these inlet ports 176, 180 enabling the first fluid to enter the rotary IPX 160 to exchange pressure, while the outlet ports 180, 182 enable the first fluid to then exit the rotary IPX 160. In operation, the inlet port 176 may receive a high-pressure (HP) first fluid, and after exchanging pressure, the outlet port 178 may be used to route a low-pressure (LP) first fluid out of the rotary IPX 160. Similarly, inlet port 180 may receive a LP second fluid and the outlet port 182 may be used to route a HP second fluid out of the rotary IPX 160. The end caps 168 and 170 include respective end covers 184 and 186 disposed within respective manifolds 172 and 174 that enable fluid sealing contact with the rotor 166. The rotor 166 may be cylindrical and disposed in the sleeve 164, which enables the rotor 166 to rotate about the axis 188. The rotor 166 may have a plurality of channels 190 extending substantially longitudinally through the rotor 166 with openings 192 and 194 at each end arranged symmetrically about the longitudinal axis 188. The openings 192 and 194 of the rotor 166 are arranged for hydraulic communication with inlet and outlet apertures 196 and 198; and 200 and 202 in the end covers 184 and 186, in such a manner that during rotation the channels 190 are exposed to fluid at high-pressure and fluid at low-pressure. As illustrated, the inlet and outlet apertures 196 and 198, and 200 and 202 may be designed in the form of arcs or segments of a circle (e.g., C-shaped).

In some embodiments, a controller using sensor feedback may control the extent of mixing between the first and second fluids in the rotary IPX 160, which may be used to improve the operability of the fluid handling system. For example, varying the proportions of the first and second fluids entering the rotary IPX 160 allows the plant operator to control the amount of fluid mixing within the hydraulic energy transfer system. Three characteristics of the rotary IPX 160 that affect mixing are: (1) the aspect ratio of the rotor channels 190, (2) the short duration of exposure between the first and second fluids, and (3) the creation of a fluid barrier (e.g., an interface) between the first and second fluids within the rotor channels 190. First, the rotor channels 190 are generally long and narrow, which stabilizes the flow within the rotary IPX 160. In addition, the first and second fluids may move through the channels 190 in a plug flow regime with very little axial mixing. Second, in certain embodiments, the speed of the rotor 166 reduces contact between the first and second fluids. For example, the speed of the rotor 166 may reduce contact times between the first and second fluids to less than approximately 0.15 seconds, 0.10 seconds, or 0.05 seconds. Third, a small portion of the rotor channel 190 is used for the exchange of pressure between the first and second fluids. Therefore, a volume of fluid remains in the channel 190 as a barrier between the first and second fluids. All these mechanisms may limit mixing within the rotary IPX 160. Moreover, in some embodiments, the rotary IPX 160 may be designed to operate with internal pistons that isolate the first and second fluids while enabling pressure transfer.

FIGS. 2-5 are exploded views of an embodiment of the rotary IPX 160 illustrating the sequence of positions of a single channel 190 in the rotor 166 as the channel 190 rotates through a complete cycle. It is noted that FIGS. 2-5 are simplifications of the rotary IPX 160 showing one channel 190, and the channel 190 is shown as having a circular cross-sectional shape. In other embodiments, the rotary IPX 160 may include a plurality of channels 190 with the same or different cross-sectional shapes (e.g., circular, oval, square, rectangular, polygonal, etc.). Thus, FIGS. 2-5 are simplifications for purposes of illustration, and other embodiments of the rotary IPX 160 may have configurations different from that shown in FIGS. 2-5. As described in detail below, the rotary IPX 160 facilitates pressure exchange between the first and second fluids by enabling the first and second fluids to momentarily contact each other within the rotor 166. In certain embodiments, this exchange happens at speeds that result in limited mixing of the first and second fluids.

In FIG. 2, the channel opening 192 is in a first position. In the first position, the channel opening 192 is in fluid communication with the aperture 198 in endplate 184 and therefore with the manifold 172, while opposing channel opening 194 is in hydraulic communication with the aperture 202 in end cover 186 and by extension with the manifold 174. As will be discussed below, the rotor 166 may rotate in the clockwise direction indicated by arrow 204. In operation, LP second fluid 206 passes through end cover 186 and enters the channel 190, where it contacts a LP first fluid 208 at a dynamic fluid interface 210. The second fluid 206 then drives the first fluid 208 out of the channel 190, through end cover 184, and out of the rotary IPX 160. However, because of the short duration of contact, there is minimal mixing between the second fluid 206 and the first fluid 208. As will be appreciated, a pressure of the second fluid 206 is greater than a pressure of the first fluid 208, thereby enabling the second fluid 206 to drive the first fluid 208 out of the channel 190.

In FIG. 3, the channel 190 has rotated clockwise through an arc of approximately 90 degrees. In this position, the outlet 194 is no longer in fluid communication with the apertures 200 and 202 of end cover 186, and the opening 192 is no longer in fluid communication with the apertures 196 and 198 of end cover 184. Accordingly, the LP second fluid 206 is temporarily contained within the channel 190.

In FIG. 4, the channel 190 has rotated through approximately 180 degrees of arc from the position shown in FIG. 2. The opening 194 is now in fluid communication with aperture 200 in end cover 186, and the opening 192 of the channel 190 is now in fluid communication with aperture 196 of the end cover 184. In this position, the HP first fluid 208 enters and pressurizes the LP second fluid 206 driving the second fluid 206 out of the fluid channel 190 and through the aperture 200 for use in the system or disposal.

Figure 6:
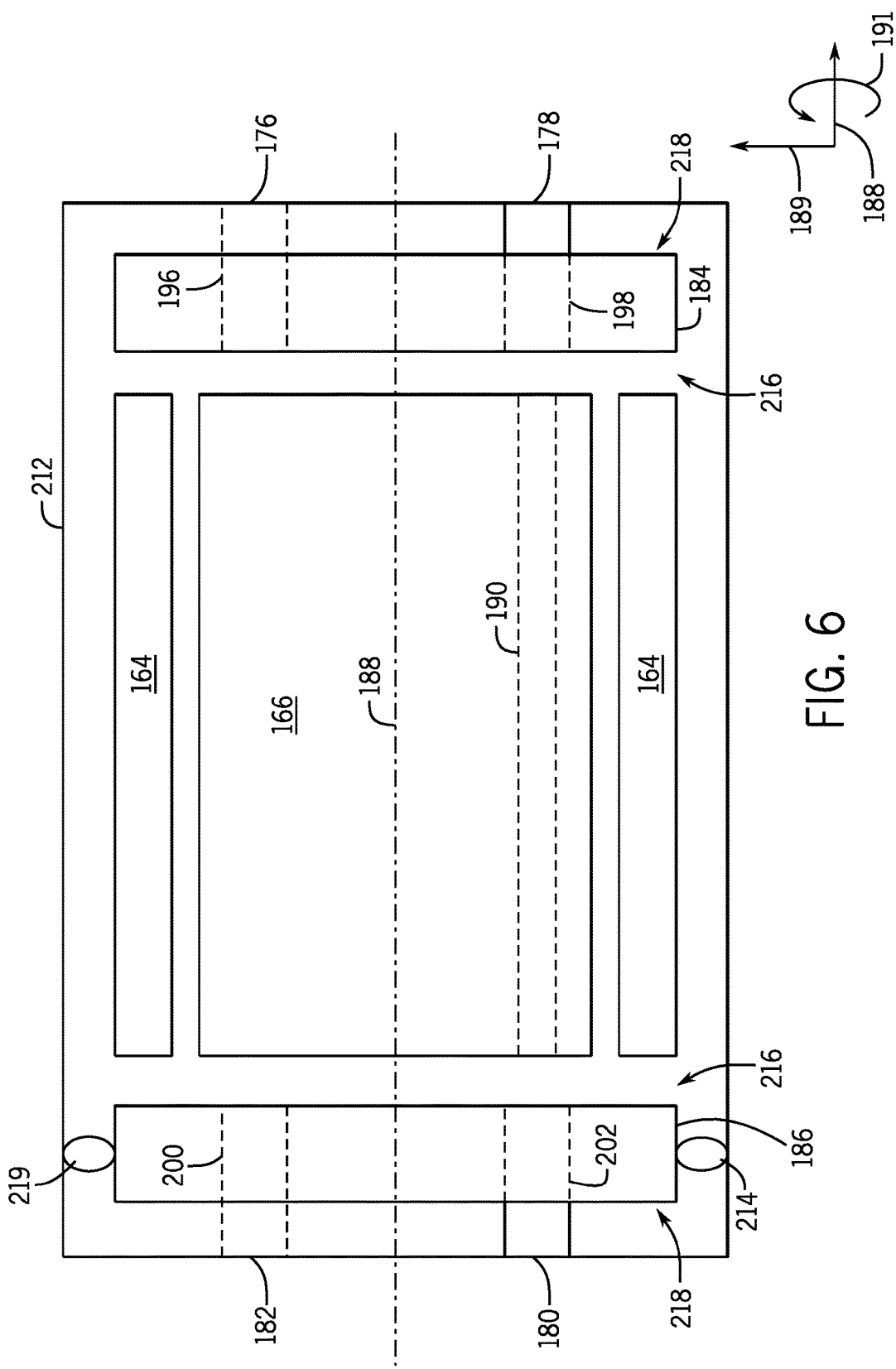
FIG. 6 is a schematic cross-sectional view of an embodiment of the rotary IPX of FIG. 1.

In FIG. 5, the channel 190 has rotated through approximately 270 degrees of arc from the position shown in FIG. 6. In this position, the outlet 194 is no longer in fluid communication with the apertures 200 and 202 of end cover 186, and the opening 192 is no longer in fluid communication with the apertures 196 and 198 of end cover 184. Accordingly, the first fluid 208 is no longer pressurized and is temporarily contained within the channel 190 until the rotor 166 rotates another 90 degrees, starting the cycle over again.

FIG. 6 is a schematic cross-sectional view of an embodiment of the rotary IPX 160. It will be appreciated that FIG. 6 is a simplified view of the rotatory IPX 160 and certain details have been omitted for clarity. In the illustrated embodiment, the rotary IPX 160 includes the housing 212 containing the sleeve 164 (e.g., annular sleeve), the rotor 166, the end covers 184, 186, and a seal 214 (e.g., annular seal) among other components. As illustrated, the seal 214 may be disposed between the housing 212 and the end cover 186 to substantially block the flow of the first fluid 208 from exiting the housing 212. However, in the illustrated embodiment, the seal 214 is not positioned about the end cover 184. As discussed above, the HP first fluid 208 may enter the rotary IPX 160 through the inlet 176 and the aperture 196 to drive the LP second fluid 206 out of the channel 190. As a result, the rotor 166 and/or the end covers 184, 186 may be subjected to a pressure differential that may cause deflections.

In operation, the pressure differentials may act on the sleeve 164 and the end covers 184, 186. For example, a first pressure differential 216 may form in a vicinity of the aperture 198 causing the sleeve 164 to deflect radially inward (e.g., toward the axis 188). As a result, the radial clearance between the rotor 166 and the sleeve 164 is reduced and may increase wear between the rotor 166 and the sleeve 164 during operation. Moreover, a second pressure differential 218 may form near the end covers 184, 186 and the rotor 166. As a result, the end covers 184, 186 may deflect axially inward (e.g., toward the rotor 166), thereby reducing axial clearances between the rotor 166 and the end covers 184, 186. To this end, the likelihood of the rotor 166 contacting the end covers 184, 186 may increase because of the reduced clearances.

Figure 7:
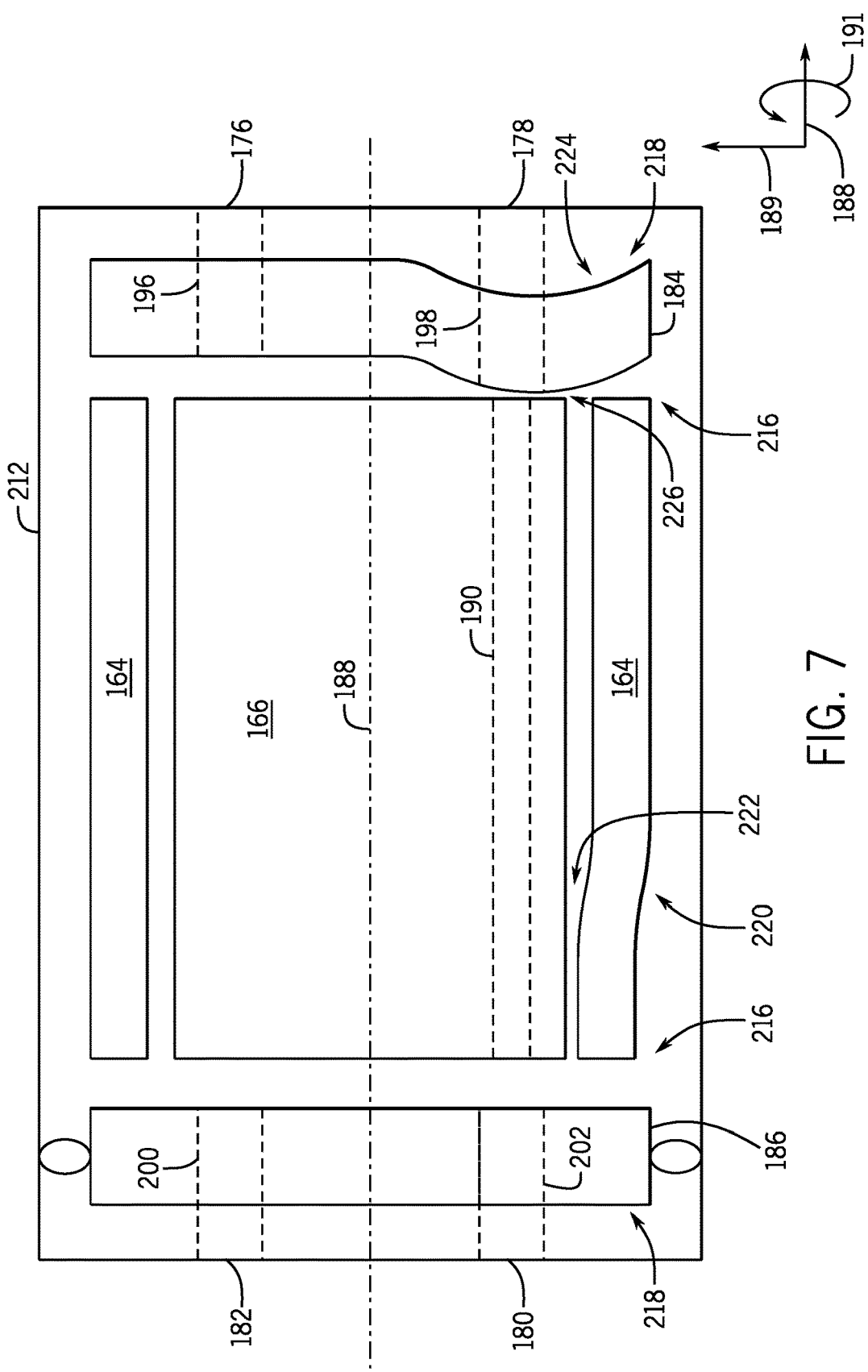
FIG. 7 is a schematic cross-sectional view of an embodiment of the rotary IPX of FIG. 1 in which the rotor and end cover have deflection points.

FIG. 7 is a schematic cross-sectional view of an embodiment of the rotary IPX 160 having deflection points along the sleeve 164 and the end cover 184. As mentioned above, the differential pressures 216, 218 may cause deflections of the sleeve 164 and/or the end cover 184. In the illustrated embodiment, the sleeve 164 includes a first deflection point 220 (e.g., radial deflection) forming a reduced clearance area 222 (e.g., radial clearance area) between the sleeve 164 and the rotor 166. Additionally, the end cover 184 includes a second deflection point 224 (e.g., axial deflection) having a reduced clearance area 226 (e.g., axial clearance area) between the end cover 184 and the rotor 166. As a result, without the disclosed embodiments, the rotor 166 may contact and/or rub against the sleeve 164 and/or the end cover 184. Moreover, while the illustrated embodiment includes the first and second deflection points 220, 224, in other embodiments there may be more or fewer deflection points. Additionally, the deflection points may be distributed across the entire length of the sleeve 164 and/or the end covers 184, 186.

Figure 8:
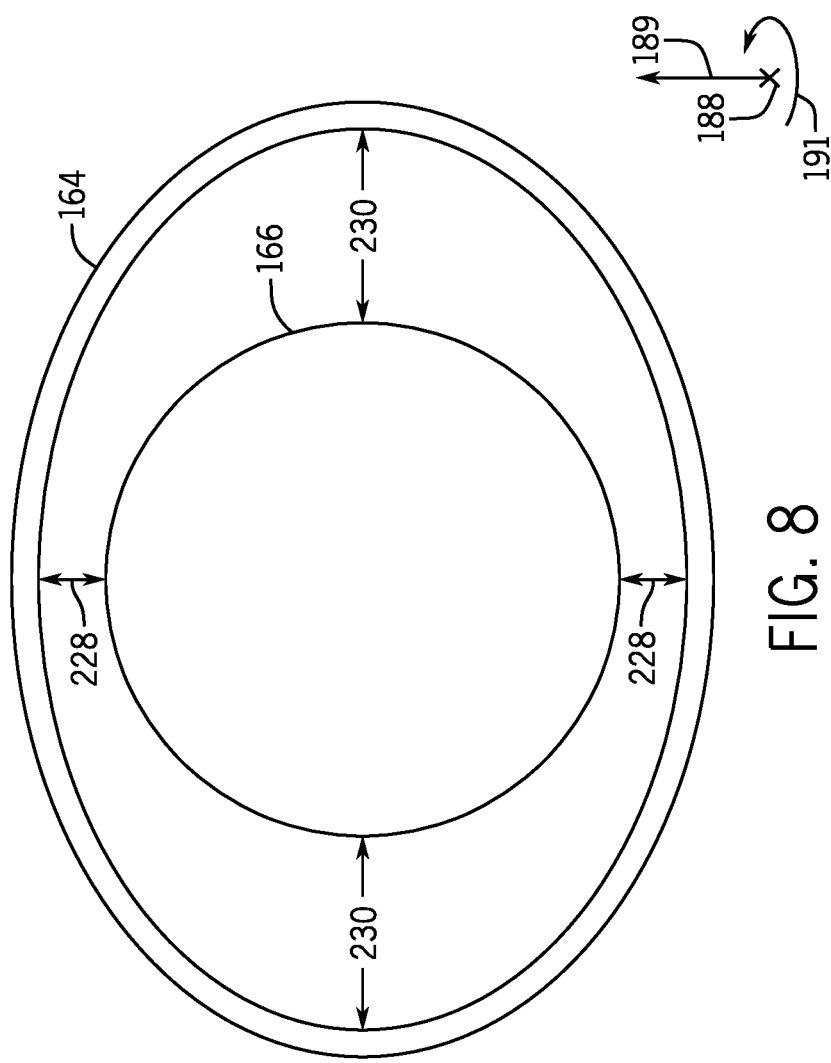
FIG. 8 is an axial end view of an embodiment of a sleeve and rotor of the rotary IPX of FIG. 1.

FIG. 8 is an axial end view of an embodiment of the rotor 166 and the sleeve 164 having a non-circular cross-section. The non-circular cross-section may include an elliptical cross-section and may have an eccentricity ranging from greater than 0 to less than 1, and all ranges therebetween. As described above, the first pressure differential 216 may deform the sleeve 164 radially inward (e.g., toward the axis 188). In the illustrated embodiment, the sleeve 164 is substantially elliptically shaped. As a result, deformation of the sidewalls of the sleeve 164 may not decrease the clearance between the rotor 166 and the sleeve 164. For example, the top and bottom portions of the rotor 166 have a first radial clearance 228 between the rotor 166 and the sleeve 164 along a first plane 241. Additionally, the left and right sides of the rotor 166 have a second radial clearance 230 between the rotor 166 and the sleeve 164 along a second plane 243. In the illustrated embodiment, the second radial clearance 230 is larger than the first radial clearance 228. In certain embodiments, the difference in size between the first and second radial clearances 228, 230 may be specifically designed in areas to account for deflection (e.g., radial deflection) of the sleeve 164. In other words, the difference in the radial clearance 228 along the first plane 241 and the radial clearance 230 along the second plane 243 may be varied (e.g., made smaller or larger) for different conditions. Additionally, the difference in size between the first and second radial clearances 228, 230 may be approximately equal to the anticipated deflection distance as a result of the first pressure differential 216. Accordingly, if the first pressure differential 216 deforms/deflects the left and right sides of the sleeve 164 radially inward toward the rotor 166, the second radial clearance 230 will be substantially similar to the first radial clearance 228 after the deflection. In other words, the initial second radial clearance 230 may be particularly selected to form a substantially uniform radial clearance about the circumference of the rotor 166 once the first pressure differential 216 deflects the sleeve 164. While the illustrated embodiment includes a substantially equal second radial clearance 230 on the left and right sides of the rotor 166, in other embodiments the second radial clearance 230 on the left side may be different than the radial clearance on the right side. For example, under certain operating conditions, the sleeve 164 may deform more on the left side than the right side. As a result, the radial clearance on the left side may be larger than the radial clearance on the right side to accommodate the increased deflection/deformation.

Figure 9:
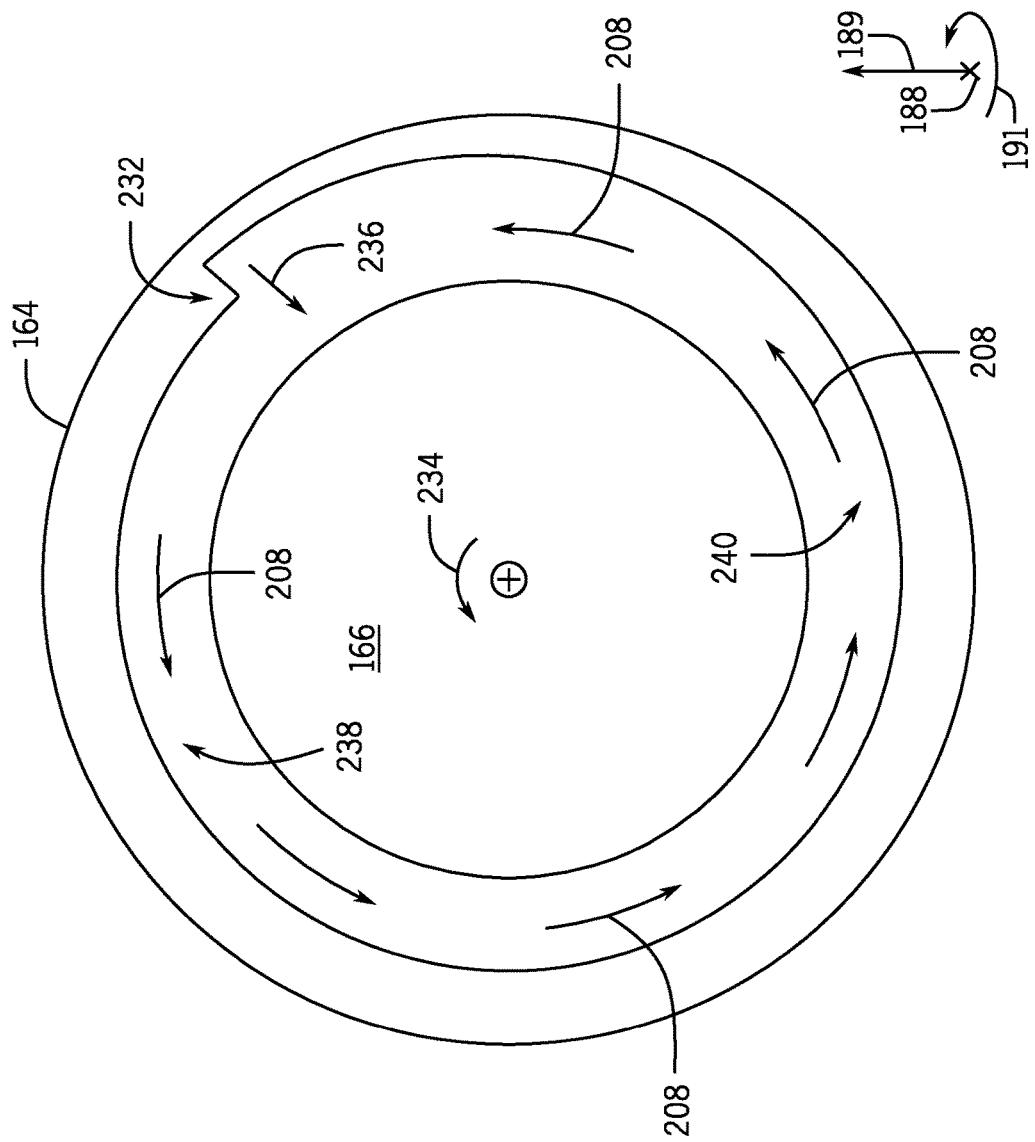
FIG. 9 is an axial end view of an embodiment of a sleeve and rotor of the rotary IPX of FIG. 1.

FIG. 9 is an axial end view of an embodiment of the rotor 166 and the sleeve 164 having a pressure dam 232 (e.g., a hydrodynamic feature, radially inset feature). The pressure dam 232 protrudes from the wall of the sleeve 164 and is configured to control the flow of fluid in the sleeve 164. During operation, the rotor 166 rotates within the sleeve 164 surrounded by a fluid (e.g., the first fluid 208), acting as a hydrodynamic bearing (e.g., fluid bearing). As the rotor 166 rotates in a first direction 234, the fluid similarly rotates along with the rotor 166 in the first direction 234. The pressure dam 232 is configured to redirect the fluid toward the rotor 166 in a direction 236. That is, during rotation, the fluid contacts the pressure dam 232 and is redirected toward the rotor 166. Additionally, the quantity of fluid in a first section 238 of the sleeve downstream of the pressure dam 232 (e.g., along the first direction 234) is less than the quantity of fluid in a second section 240 of the sleeve 164 approximately 180 degrees from the pressure dam 232. As a result, the force acting on the rotor 166 is greater in the first section 238 because of the reduced area. Therefore, the first section 238 of the sleeve 164 may be positioned such that the anticipated area of max deflection is in the first section 238, such that the higher force will drive the rotor 166 away from the sleeve 164. Accordingly, the reduced radial clearance formed by the deflection of the sleeve 164 may be accounted for by driving the rotor 166 toward the second section 240.

Figure 10:
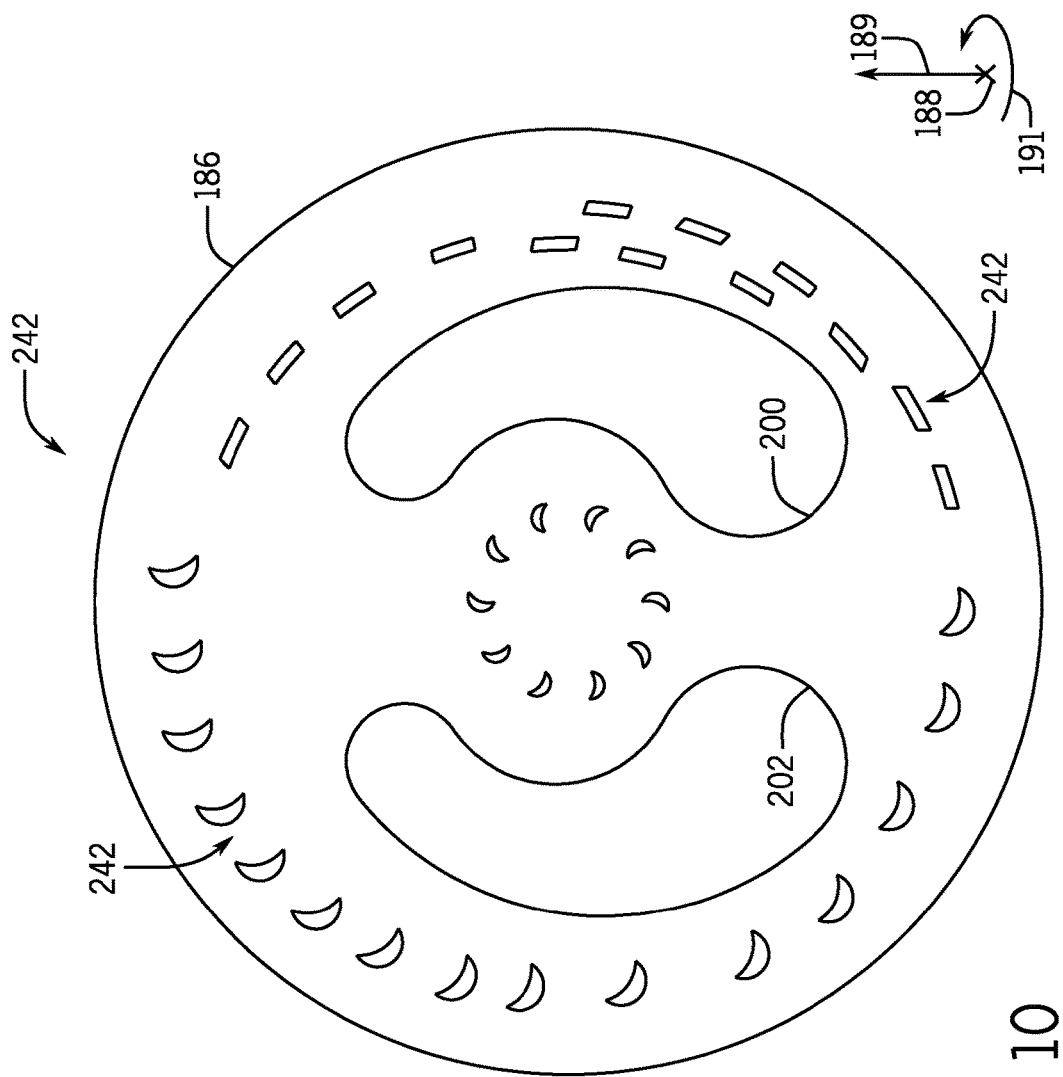
FIG. 10 is an axial end view of an embodiment of an end cover of the rotary IPX of FIG. 1.

As described above, the second pressure differential 218 may facilitate deflection/deformation of the end covers 184, 186. As a result, the likelihood of the rotor 166 contacting the end covers 184, 186 increases due to the reduced axial clearance between the rotor 166 and the end covers 184, 186. FIG. 10 is an axial end view of the end cover 186 having hydrodynamic features 242 distributed about a face of the end cover 186. For example, the hydrodynamic features 242 may include airfoil shaped indentations (e.g., recesses, depressions) in the end covers 184, 186. However, in other embodiments, the hydrodynamic features 242 may be circular, arcuate, elliptical, rectangular, or any other suitable shape. In the illustrated embodiment, hydrodynamic features 242 are distributed over a portion of the end cover 186. The hydrodynamic features 242 are configured to apply a hydraulic force against the rotor 166. For example, in certain embodiments, the rotor 166 may have a force acting on an axial end driving the rotor 166 toward the end cover 186. The hydrodynamic features 242 are configured to apply a counteracting hydraulic force against the rotor 166 (e.g., axially toward the rotor 166) to block the rotor 166 from contacting the end cover 186. Moreover, the hydrodynamic features 242 are configured to produce a larger hydraulic force as the rotational speed of the rotor 166 increases.

Returning to the hydrodynamic features 242, in certain embodiments, the hydrodynamic features 242 extend into the end cover 186 (e.g., depressions, cavities, recesses, indentations). For example, the hydrodynamic features may be formed by machining, cutting, or any other appropriate manufacturing process. As fluid enters the hydrodynamic features 242, the hydrodynamic features 242 generate lift by redirecting the fluid flow axially toward the rotor 166, thereby driving the rotor 166 away from the end cover 186. In some embodiments, the hydrodynamic features 242 may be disposed radially outside of the apertures 200, 202 or radially inset from the apertures 200, 202. While the illustrated embodiment includes airfoil shaped features 242, in other embodiments the hydrodynamic features 242 may be other shapes, such as arcs, squares, or the like. For example, the hydrodynamic features 242 may include rectangular features 242. In certain embodiments, hydrodynamic features 242 may include both the airfoil shaped features 242 and the rectangular features 242 on the axial face of the end covers 184, 186, the axial faces of the rotor 166, or a combination thereof. In some embodiments, the hydrodynamic features 242 on the end covers 184, 186 may be limited to only the airfoil shaped features 242 or only the rectangular features 242.

Figure 11:
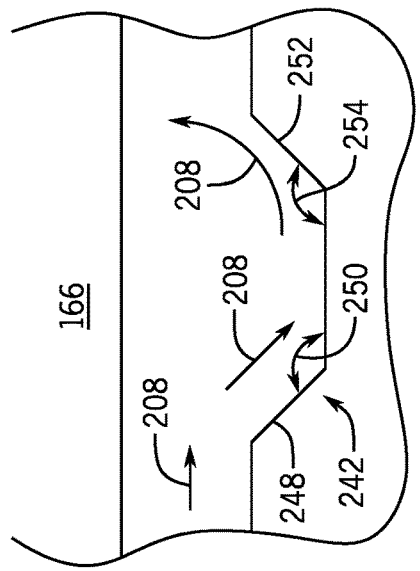
FIG. 11 is a cross-sectional view of an embodiment of the hydrodynamic features of FIG. 10.
Figure 12:
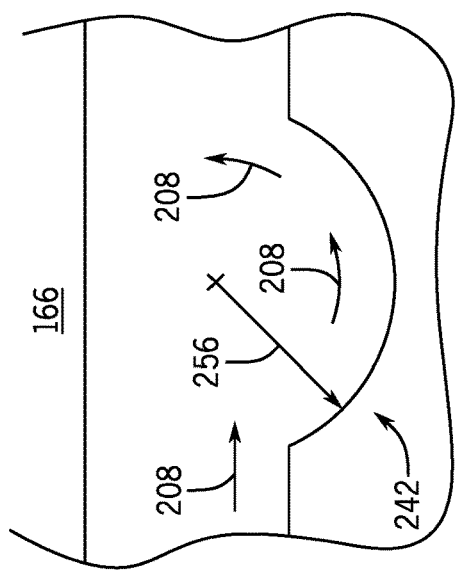
FIG. 12 is a cross-sectional view of an embodiment of the hydrodynamic features of FIG. 10.

FIGS. 11-14 are cross-sectional views of embodiments of the hydrodynamic features 242 that may be formed on the face of the end covers 184, 186. As shown, the hydrodynamic features 242 are recessed into the face of the end cover 186. In FIG. 11, the hydrodynamic feature 242 includes a wedge-shaped depression (e.g., inwardly converging recess or inwardly angled recess). For example, a first side 248 is positioned at a first angle 250 while a second side 252 is positioned at a second angle 254. In certain embodiments, the first angle 258 is equal to the second angle 254. However, in other embodiments, the first angle 250 and the second angle 254 may be unequal. Additionally, in certain embodiments, the first angle 258 or the second angle 254 may be approximately 90 degrees, approximately 100 degrees, approximately 110 degrees, approximately 120 degrees, approximately 130 degrees, approximately 140 degrees, approximately 150 degrees, or any other suitable angle. Additionally, the first or second angles 250, 254 may be between approximately 90 degrees and approximately 110 degrees, between approximately 110 degrees and approximately 130 degrees, between approximately 130 degrees and approximately 150 degrees, or any other suitable range. Moreover, in other embodiments, the first or second angles 250, 254 may be greater than approximately 90 degrees, greater than approximately 100 degrees, greater than approximately 110 degrees, greater than approximately 120 degrees, greater than approximately 130 degrees, greater than approximately 140 degrees, greater than approximately 150 degrees, or any other suitable angle. In operation, the first fluid 208 enters the hydrodynamic feature 242 and engages the second side 252. As a result, the first fluid 208 is directed toward the rotor 166, providing a force that drives the rotor 166 away from the end cover 184. Additionally, while the second side 252 is configured to drive the first fluid 208 toward the rotor 166, the second side 252 also enables debris that may enter the hydrodynamic feature 242 to escape. For example, the sloped second side 252 forms a pathway for trapped debris (e.g., sand, proppant, salt, etc.) to leave the hydrodynamic feature 242.

Figure 13:
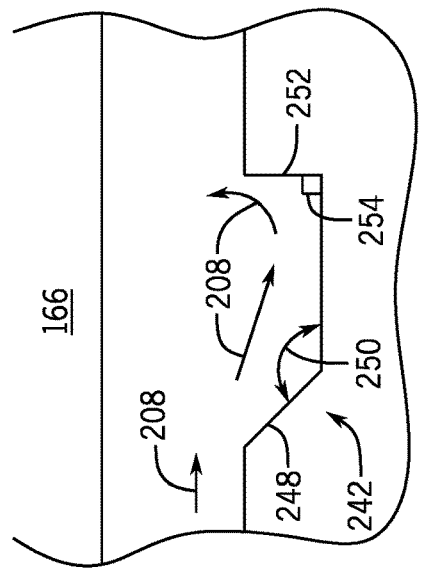
FIG. 13 is a cross-sectional view of an embodiment of the hydrodynamic features of FIG. 10.
Figure 14:
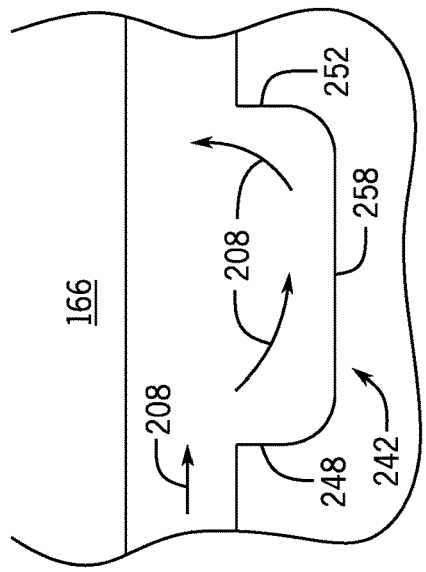
FIG. 14 is a cross-sectional view of an embodiment of the hydrodynamic features of FIG. 10.
Figure 15:
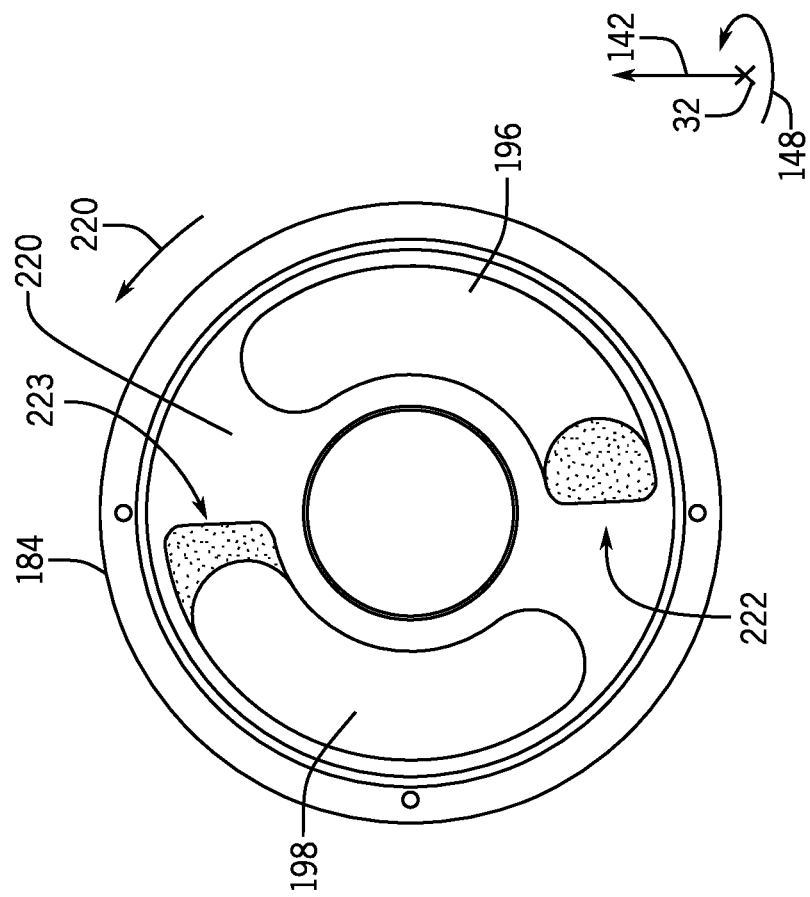
FIG. 15 is a further embodiment of the hydrodynamic feature having a substantially arcuate cross section.

FIG. 15 is a further embodiment of the hydrodynamic feature 242 having a substantially circular and/or arcuate cross section (e.g., inwardly curved recess, concave recess, U-shaped recess). In the illustrated embodiment, the hydrodynamic feature 242 has a radius 256. As described above, the first fluid 208 enters the hydrodynamic feature 242 and is directed toward the rotor 166 via contact with a far end of the hydrodynamic feature 242. Additionally, the curved edges of the hydrodynamic feature 242 enable debris that may enter the hydrodynamic feature 242 to escape the hydrodynamic feature 242. FIG. 13 is another embodiment of the hydrodynamic feature 242. In the illustrated embodiment, the second angle 254 is approximately equal to 90 degrees. However, the first side 248 is sloped at the first angle 250, greater than 90 degrees. For example, the first angle 250 may be approximately 110 degrees, approximately 120 degrees, approximately 130 degrees, approximately 140 degrees, approximately 150 degrees, or any other suitable angle. Additionally, the first angle 250 may be between approximately 90 degrees and approximately 110 degrees, between approximately 110 degrees and approximately 130 degrees, between approximately 130 degrees and approximately 150 degrees, or any other suitable range. Moreover, in other embodiments, the first angle 250 may be greater than approximately 90 degrees, greater than approximately 100 degrees, greater than approximately 110 degrees, greater than approximately 120 degrees, greater than approximately 130 degrees, greater than approximately 140 degrees, greater than approximately 150 degrees, or any other suitable angle. In operation, the first fluid 208 enters the hydrodynamic feature 242 and engages the second side 252. Accordingly, as described above, entering fluid may travel into the hydrodynamic feature 242 and engage the second side 252, thereby directing the fluid toward the rotor 166. FIG. 14 is another embodiment in which the first and second sides 248, 252 have rounded edges where the first and second sides 248, 252 encounter a bottom surface 258 of the hydrodynamic feature 242. Additionally, the end covers 184, 186 and/or the rotor 166 may include different types of hydrodynamic features 242 along the respective axial faces.

Figure 16:
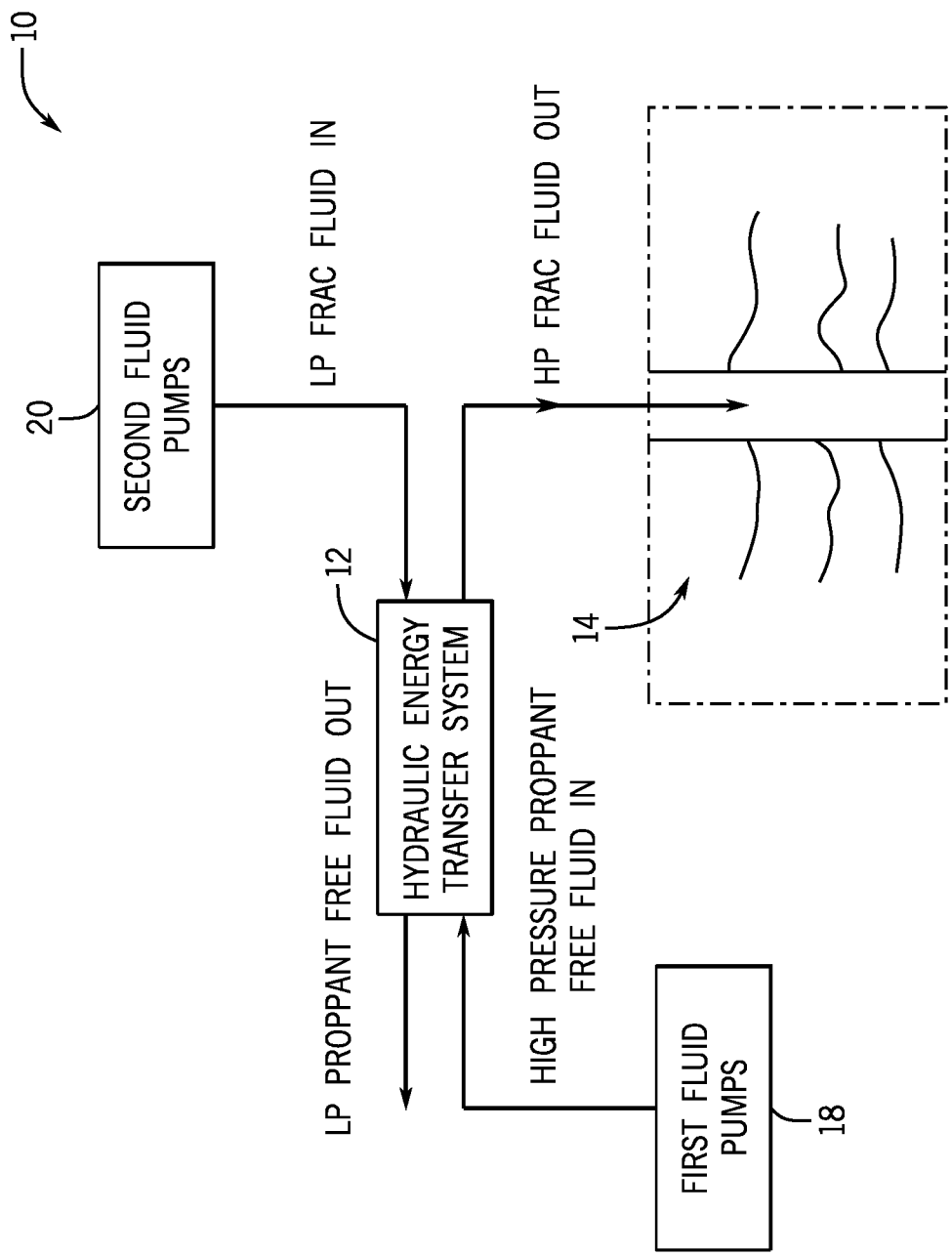
FIG. 16 is a schematic diagram of an embodiment of a frac system with a hydraulic energy transfer system.

FIG. 16 is a schematic diagram of an embodiment of a frac system 10 (e.g., fluid handling system) with a hydraulic energy transfer system 12. In operation, the frac system 10 enables well completion operations to increase the release of oil and gas in rock formations. The frac system 10 may include one or more first fluid pumps 18 and one or more second fluid pumps 20 coupled to a hydraulic energy transfer system 12. For example, the hydraulic energy system 12 may include a hydraulic turbocharger, rotary IPX, reciprocating IPX, or any combination thereof. In addition, the hydraulic energy transfer system 12 may be disposed on a skid separate from the other components of a frac system 10, which may be desirable in situations in which the hydraulic energy transfer system 12 is added to an existing frac system 10. In operation, the hydraulic energy transfer system 12 transfers pressures without any substantial mixing between a first fluid (e.g., proppant free fluid) pumped by the first fluid pumps 18 and a second fluid (e.g., proppant containing fluid or frac fluid) pumped by the second fluid pumps 20. In this manner, the hydraulic energy transfer system 12 blocks or limits wear on the first fluid pumps 18 (e.g., high-pressure pumps), while enabling the frac system 10 to pump a high-pressure frac fluid into the well 14 to release oil and gas. In addition, because the hydraulic energy transfer system 12 is configured to be exposed to the first and second fluids, the hydraulic energy transfer system 12 may be made from materials resistant to corrosive and abrasive substances in either the first and second fluids. For example, the hydraulic energy transfer system 12 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a rotary isobaric pressure exchanger (IPX) configured to exchange pressures between a first fluid and a second fluid, wherein the first fluid has a pressure higher than the second fluid, comprising:
  a cylindrical rotor, wherein the cylindrical rotor is configured to rotate circumferentially about a rotational axis and has a first end face and a second end face disposed opposite each other;
  a first end cover having a first surface that interfaces with the first end face of the cylindrical rotor, wherein the first end cover comprises a first fluid inlet and a first fluid outlet;
  a second end cover having a second surface that interfaces with the second end face of the cylindrical rotor; and
  a first plurality of recesses formed in the first surface of the first end cover, wherein the first plurality of recesses are configured to direct a bearing fluid in an axial direction to apply a hydrodynamic force against the first end face to keep the cylindrical rotor from contacting the first end cover during rotation of the cylindrical rotor, wherein the first plurality of recesses does not contact the first fluid inlet and the first fluid outlet,
  wherein the first plurality of recesses are disposed radially between the first fluid inlet and the first fluid outlet.

2. A system, comprising:
a rotary isobaric pressure exchanger (IPX) configured to exchange pressures between a first fluid and a second fluid, wherein the first fluid has a pressure higher than the second fluid, comprising:
  a cylindrical rotor, wherein the cylindrical rotor is configured to rotate circumferentially about a rotational axis and has a first end face and a second end face disposed opposite each other;
  a first end cover having a first surface that interfaces with the first end face of the cylindrical rotor, wherein the first end cover comprises a first fluid inlet and a first fluid outlet;
  a second end cover having a second surface that interfaces with the second end face of the cylindrical rotor; and
  a first plurality of recesses formed in the first surface of the first end cover, wherein the first plurality of recesses are configured to direct a bearing fluid in an axial direction to apply a hydrodynamic force against the first end face to keep the cylindrical rotor from contacting the first end cover during rotation of the cylindrical rotor, wherein the first plurality of recesses does not contact the first fluid inlet and the first fluid outlet,
  wherein a first set of recesses of the first plurality of recesses are disposed radially outside the first fluid inlet and the first fluid outlet, and a second set of recesses of the first plurality of recesses is disposed radially between the first fluid inlet and the first fluid outlet.

* * * * *